United States Patent
Wang et al.

(10) Patent No.: US 6,826,160 B1
(45) Date of Patent: Nov. 30, 2004

(54) DYNAMIC BANDWIDTH ALLOCATION THROUGH MULTI-CHANNEL TIME SLOT ASSIGNMENT AND MIGRATION FOR BROADBAND ACCESS

(75) Inventors: Peter S. Wang, Cupertino, CA (US); Ben Y. Yu, Fremont, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/348,983

(22) Filed: Jul. 7, 1999

(51) Int. Cl.[7] .................................................. H04Q 7/00
(52) U.S. Cl. ...................... 370/329; 370/343; 370/345; 370/436; 370/437; 370/468
(58) Field of Search ................................ 370/278, 280, 370/314, 322, 326, 328, 330, 336, 341, 343, 345, 436, 437, 442, 468, 477, 478, 480, 329

(56) References Cited

U.S. PATENT DOCUMENTS

| | | | | |
|---|---|---|---|---|
| 5,729,534 A | * | 3/1998 | Jokinen et al. ............. | 370/280 |
| 5,745,694 A | * | 4/1998 | Egawa et al. ............... | 709/225 |
| 5,793,744 A | * | 8/1998 | Kanerva et al. ............ | 370/209 |
| 5,920,571 A | * | 7/1999 | Houck et al. ............... | 370/458 |
| 5,966,374 A | * | 10/1999 | Rasanen ...................... | 370/337 |
| 6,018,528 A | * | 1/2000 | Gitlin et al. ................ | 370/436 |
| 6,031,827 A | * | 2/2000 | Rikkinen et al. .......... | 370/330 |
| 6,064,662 A | * | 5/2000 | Gitlin et al. ................ | 370/330 |
| 6,097,733 A | * | 8/2000 | Basu et al. .................. | 370/468 |
| 6,134,226 A | * | 10/2000 | Reed et al. .................. | 370/328 |
| 6,262,980 B1 | * | 7/2001 | Leung et al. ............... | 370/336 |
| 6,266,330 B1 | * | 7/2001 | Jokinen et al. ............. | 370/329 |
| 6,359,900 B1 | * | 3/2002 | Dinakar et al. ............ | 370/458 |
| 6,377,548 B1 | * | 4/2002 | Chuah ......................... | 370/233 |
| 6,400,685 B1 | * | 6/2002 | Park ............................ | 370/232 |
| 6,438,136 B1 | * | 8/2002 | Bahl ........................... | 370/458 |

OTHER PUBLICATIONS

Koraitim, H. et al "Resource Allocation and Connection Admission Control in Satellite Networks" Selected Areas in Communications, vol. 17, Issue 2, Feb. 1999, pp. 360–372.*
Farnham, T. et al "Dynamic Reconfiguration and Efficient Resource Allocation for Indoor Broadband Wireless Networks" Universal Personal Communications, vol. 1, Oct. 5–9, 1998, pp. 53–57.*
Koyuncu, O. et al "Dynamic Resource Assignment Using Network Flows in Wireless Data Networks" Vehicular Technology Conference, vol. 1, May 16–20, 1999, pp. 1–5.*
Liu, H. et al "Efficient Bandwidth Allocation for Integrated Services in Broadband Wireless ATM Networks" Communications, Vo 3, Jun. 6–10, 1999, pp. 1896–1900.*

* cited by examiner

*Primary Examiner*—Chi Pham
*Assistant Examiner*—Anh-Vu Ly

(57) ABSTRACT

A method to dynamically allocate time slots in multiple channels of a bandwidth over which a device can communicate on the network. In one embodiment, the present invention recites a method comprising several steps. First, a request to log onto a network is received from a device. Then, a loading condition of the network is determined. Finally, specific transmitting channels on which the new device is allocated to transmit information is assigned.

27 Claims, 10 Drawing Sheets

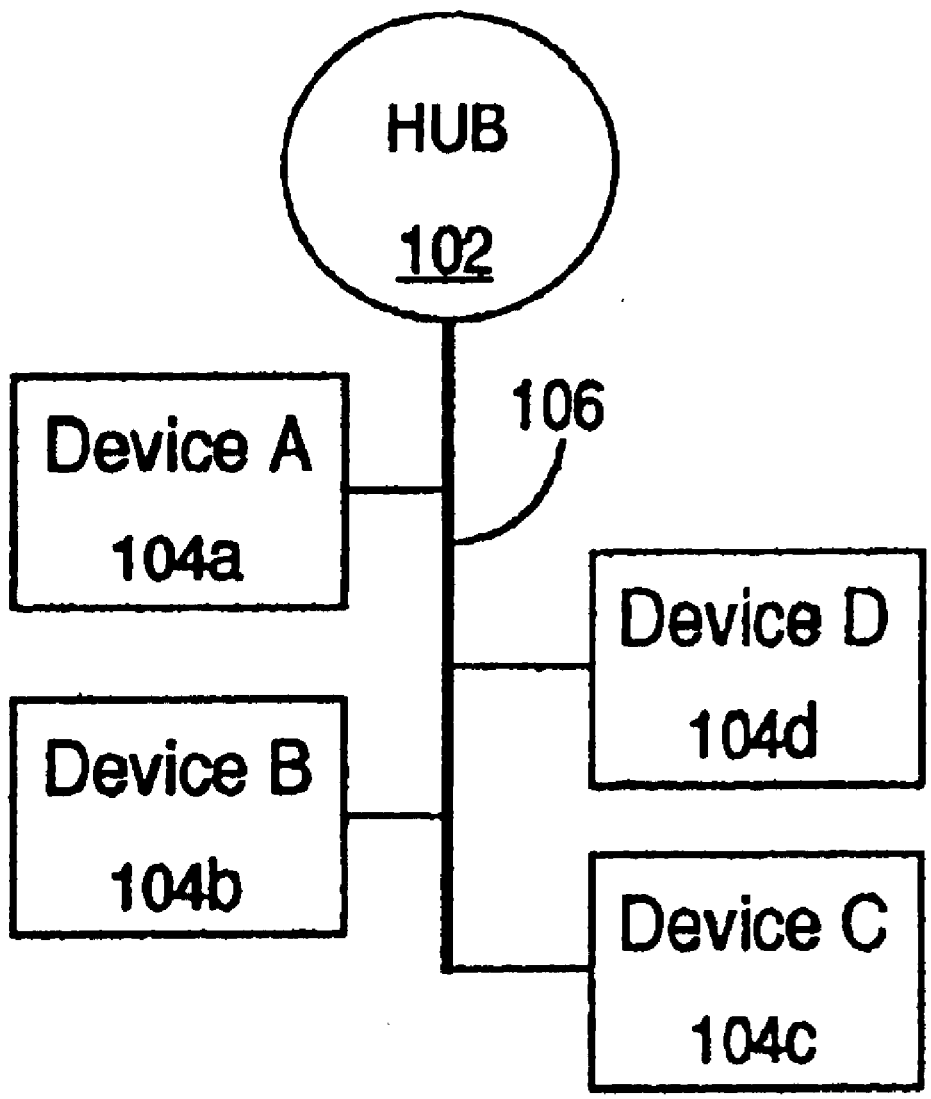
Prior Art Fig. 1a

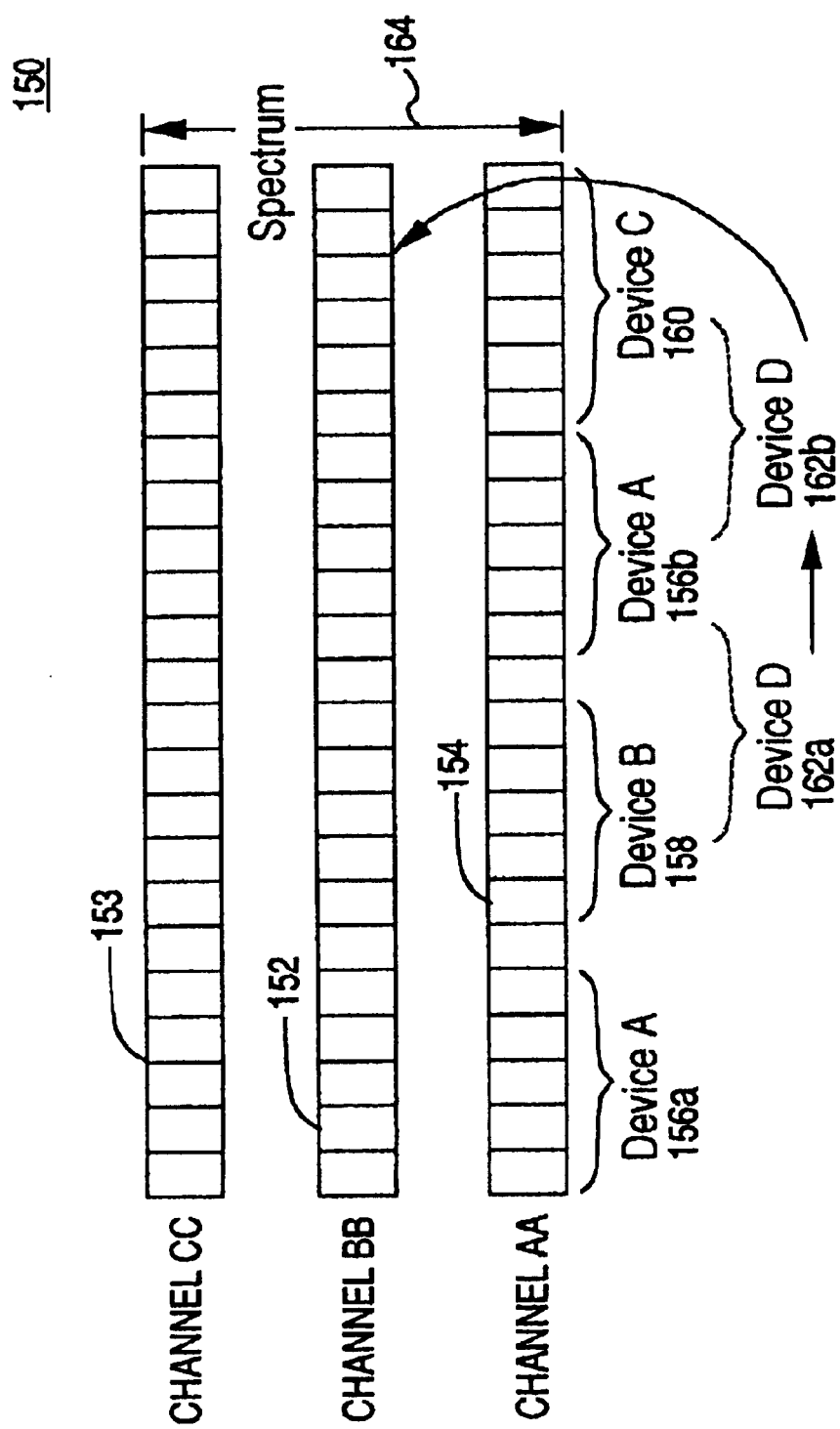
Prior Art Fig. 1b

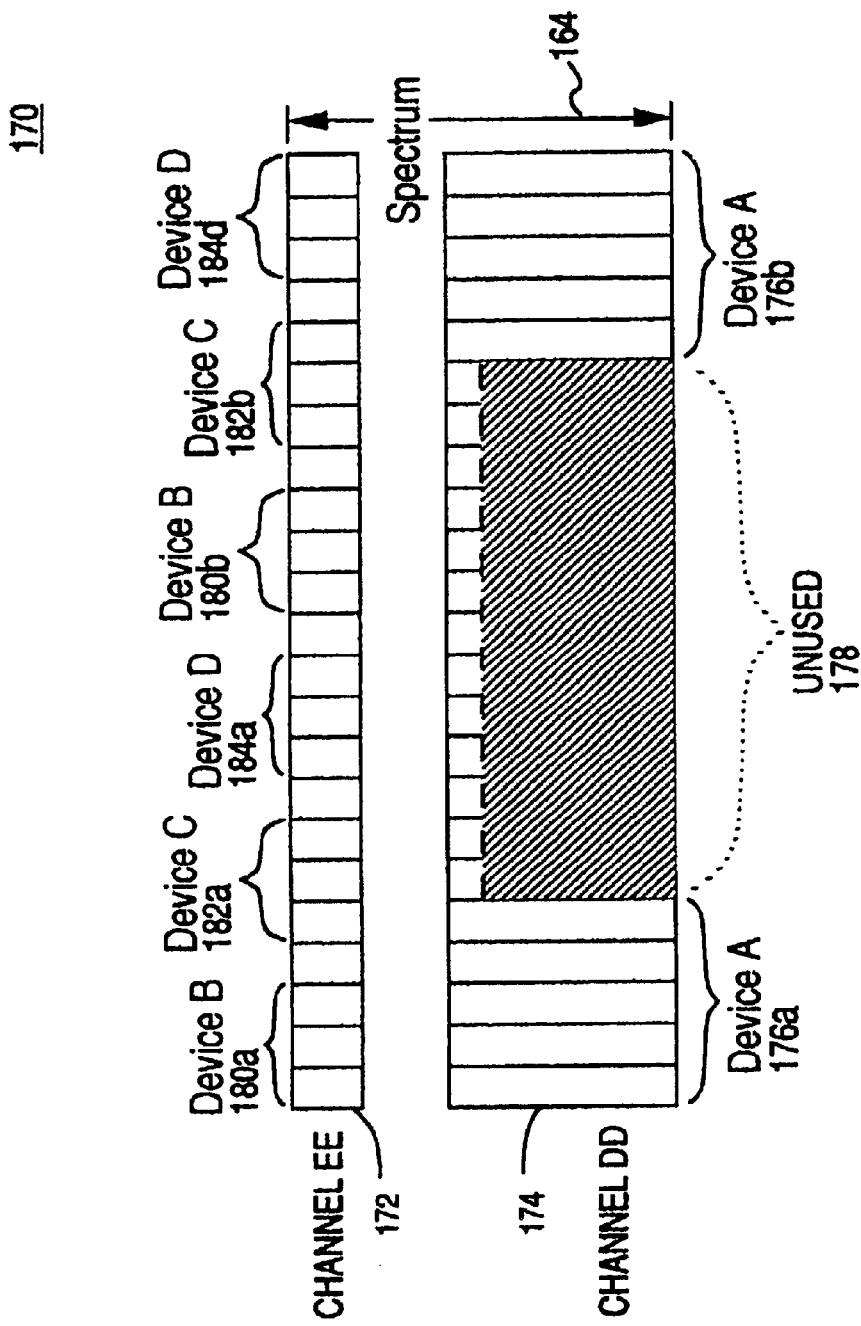
Prior Art Fig. 1c

500

```
        ┌─────────┐
        │  Start  │
        └────┬────┘
             ▼
┌──────────────────────────────────────────────┐
│ Receive a request to change a device from a  │
│ first service class to a second service class│
│                                          502 │
└──────────────────────┬───────────────────────┘
                       ▼
┌──────────────────────────────────────────────┐
│ Verify request against the transmission      │
│ capability of the device and against the     │
│ subscription service of the device       504 │
└──────────────────────┬───────────────────────┘
                       ▼
┌──────────────────────────────────────────────┐
│ Specify a quantity of transmitting channels  │
│ for the device to transmit                   │
│                                          505 │
└──────────────────────┬───────────────────────┘
                       ▼
┌──────────────────────────────────────────────┐
│ Determine a loading condition                │
│                                          506 │
└──────────────────────┬───────────────────────┘
                       ▼
┌──────────────────────────────────────────────┐
│ Assign specific transmitting channels on     │
│ which the device can transmit based on the   │
│ service class and based on loading condition │
│                                          508 │
└──────────────────────┬───────────────────────┘
                       ▼
┌──────────────────────────────────────────────┐
│ Communicate the specific transmitting        │
│ channels to the device                       │
│                                          510 │
└──────────────────────┬───────────────────────┘
                       ▼
                  ┌─────────┐
                  │   End   │
                  └─────────┘
```

Fig. 5

DYNAMIC BANDWIDTH ALLOCATION THROUGH MULTI-CHANNEL TIME SLOT ASSIGNMENT AND MIGRATION FOR BROADBAND ACCESS

TECHNICAL FIELD

The present claimed invention relates to the field of network communication. Specifically, the present claimed invention relates to an apparatus and a method for dynamically allocating time slots in multiple channels of a bandwidth over which a device may communicate in a network.

BACKGROUND ART

Network communications are ubiquitous in government, businesses and education. Many obstacles have arisen in the effort to better utilize network resources, to provide better quality service to users, and to provide flexible service options to users. One type of network uses multiple frequency channels over which devices may communicate. This type of network is referred to as a Broadband Access Network (BAN). Several of the obstacles for optimal utilization of a BAN will be presented along with the consequential need to solve them.

Prior Art FIG. 1a presents a block diagram of a conventional shared media network system. For exemplary purposes, four devices, e.g. Customer Premises Equipment (CPE), 104a, 104b, 104c, and 104d are coupled to a hub 102 via link 106. Link 106 can provide multiple channels of communication, typically dependent upon the transmitter/receiver capabilities of devices 104a, 104b, 104c, and 104d and the hub 102.

There are two basic methods of communicating in the present network, contention access, and reservation access. With reservation access, a device sends a request to a hub to reserve a specific length of transmission on the network. The hub processes the request, reserves a slot on the network for the requesting device, and sends instructions to the device telling it when to transmit. Subsequently, the device transmits its information according to the instructions. This process avoids collisions, but it also consumes time and resources to make and process the request. Delay sensitive applications such as Internet Telephony and video conferencing require the quality of service delivered by reservation access protocol.

On the other hand, data transmissions such as e-mail and file transfers can be more efficiently delivered by contention access protocol. With contention access, any device in a network can communicate when it has information ready to transmit and when a unused time slot appears. Unfortunately, if more than one device meets the same criteria and tries to transmit at the same time, a collision may arise. If a collision arises, the hub will send a message to the relevant devices indicating that the transmission has failed. Consequently, any device involved in a collision will have to attempt to retransmit the information. In broadband access networks similar to the one shown in Prior Art FIG. 1a, the multiple access protocol is generally a combination of reservation access and contention access for Internet access and Telephony services. A separate downlink channel is available for the hub to communicate to the devices. However, there are much fewer problems with the downlink channel than the uplink channel because a single entity, the hub, controls all transmissions on the downlink.

Prior Art FIG. 1b provides an illustration of multiple uplink channels (channels) that can be used in a hub-spoke network. It also exemplifies a conventional assignment of time slots in multiple channels over which multiple devices will communicate. The illustration presents a contention access scenario where devices communicate and hope to avoid a collision. In the example, three channels, channel AA 154, channel BB 152, and channel CC 153 are shown in parallel as they span the spectrum 164 of the network. They represent different frequency channels within the bandwidth, or spectrum 164, of the network. As shown, several packets fill up lower channel AA 154. These packets are sequentially identified as a first data packet 156a for device A 104a, a data packet 158 for device B 104b, a second data packet 156b for device A 104a, and a data packet 160 for device C 104c. This scenario illustrates that the efficiency of contention access drops when a large number of time slots in a shared channel are assigned to network devices by the reservation protocol.

Given the scenario in Prior Art FIG. 1b, a first attempt to transmit a data packet 162a for device D 104d, and a second attempt to transmit a data packet 162b for device D 104d, occur because device D 104d cannot locate an available time slot in which to transmit. Hence, device D 104d has an extended wait time for communicating, and a lower quality of service. Consequently, a need arises for a method of allowing a fairer and more consistent access to the network by devices.

One of the conventional methods of providing access to the network when one channel becomes very busy is to force the device, whose transmission is being blocked, to migrate to an empty uplink channel. In the present example, device D 104d can migrate up to channel BB 152 after repeatedly being blocked in its originally allocated channel, channel AA 154. However, this process is inefficient. Channel resources may be overburdened in one channel and underutilized in another channel. Additionally, the waiting period for the blocked device and the consequent migration process consumes valuable time and results in substandard communication performance. Consequently, a need arises for a method to more evenly utilize the multiple channel resources and thereby provide better communication performance to the user.

A user will typically transmit in just that given channel for consecutive data packets. Even if a user is forced to migrate to another channel, the user will transmit just in the new channel to which it migrated. However, sometimes two or more channels are equally busy or loaded, and assigning a device to transmit entirely on one or the other channel will cause congestion. Hence, a need arises for a method and apparatus to allow a new device to transmit on evenly loaded channels without upsetting the even loading.

As illustrated in Prior Art FIG. 1b, a device is conventionally allocated a default channel on which to transmit. This default channel conventionally remains the same for a given device. Even though different devices may be assigned to different channels in the multichannel BAN, they still maintain their default channel each time they access the network. Hence, in each channel, the bandwidth utilization can vary at any given time depending on the number of devices that are active or idle on that channel. Consequently, different channels in a multichannel network can have vastly different loading depending on whether, or when, devices log on to their allocated channel. Furthermore, the loading in each channel can be highly non-uniform if a device with a low bandwidth capability is grouped into a channel having a large bandwidth. The varied loading might mean overcrowding on one channel and unused resources on another channel.

In the present example, device A 104a, device B 104b, device C 104c, and device D 104d are all allocated to the same default channel, channel AA 154. Alternatively, these devices could have been assigned to a different default channel. The point is that, regardless of which channel they are on, once a device is assigned to a channel, the assignment does not change. As a result of this rigid convention, a need arises for a method to periodically allocate default channels in a dynamic manner to better utilize the resources on a multichannel network.

Another feature of the conventional protocol is to assign a device just a single fixed channel in which to transmit information. In conventional networking, more than one service class can be supported on a single network. However, the conventional method does not accomplish this service efficiently. The conventional method will create channel bandwidths that are specific to a service class of user.

Prior Art FIG. 1c provides an illustration of multiple uplink channels (channels) 170 for different service classes that can be used in a hub-spoke network. Similar to Prior art FIG. 1b, this new figure also exemplifies a conventional assignment of time slots in multiple channels over which devices in different service classes will communicate. While some of the same devices from Prior Art FIG. 1b are utilized here, their capabilities and requirements are different from those in Prior Art FIG. 1b.

As an example, if a user requires a wide bandwidth, e.g. device A 104a from Prior Art FIG. 1a, then a channel will be created to satisfy the user, e.g. channel DD 174 of FIG. 1c. Channel DD has a bandwidth, dedicated to the wide bandwidth user, that is equivalent to the combination of the bandwidth from two channels of FIG. 1b. If other users in the same network require only a small bandwidth, then another channel is dedicated to their bandwidth requirement, e.g. channel EE 172. These bandwidth assignments are typically fixed and do not change. Consequently, depending upon the quantity of users actively using each service class, a channel could have wasted bandwidth because the bandwidth is reserved for a given class, but is not accessible to another class. For example, if only one user is using the large bandwidth channel DD 174, and they are not transmitting large amounts of information, then a large portion of the bandwidth is not utilized for a portion of time, e.g. time slot range 178. While a device with a narrower bandwidth might be allowed to use a channel that has a higher bandwidth, this method is still inefficient because it does not utilize the full bandwidth capability of the channel. Additionally, a wide bandwidth device cannot use a narrow bandwidth channel. Thus, for example, wide bandwidth device A, in FIG. 1c, would not be allowed to transmit on channel EE 172 even though it might need to and even though no traffic might exist on channel EE 172. Thus, the prior art was primarily limited to incrementing service based on time slots, since the channel assignments were fixed. Consequently, a need arises for a more flexible manner in which to accommodate multiple service classes on a given bandwidth while balancing channel utilization at the same time.

Another limitation of the conventional networking is the difficulty involved with changing the service class for a user. If a user has subscribed to a given service class, then a dedicated device is typically used for that specific service class. If the user wishes to change service classes, then a new device for the new service class must be obtained. This method requires time, money, and other resources to accomplish a change in service class. Furthermore, frequency channelization of the bandwidth of the network might have to be rearranged in response to a need for a new service class with a wider bandwidth. Changing the frequency channelization of a network using conventional means could be expensive and time-consuming. In view of these limitations, a need arises for a method to dynamically change the service class for a user without requiring a new device. Another need arises for a method to create a new service class without having to rearrange the frequency channelization of the network bandwidth.

Furthermore, a conventional device, e.g. 104a, 104b, 104c, and 104d is sometimes required to be a smart unit in order to accomplish some of the contention protocols and methods. That is, it is an expensive device that require a microprocessor capable of performing complicated tasks. To make the device more attractive to users, a need arises for a method to improve network performance and offer flexible service options while only requiring inexpensive dumb devices.

In summary, a need arises for a method of allowing a fairer and more consistent access to the network by devices. Additionally, a need arises for a method to more evenly utilize the multiple channel resources and thereby provide better communication performance to the user. Yet another need arises for a method and apparatus to allow a new device to transmit on evenly loaded channels without upsetting the even loading. Another need arises for a method to periodically allocate default channels in a dynamic manner to better utilize the resources on a multichannel network. Yet another need arises for a more flexible manner in which to accommodate multiple service classes on a given bandwidth while equating channel utilization at the same time. Another need arises for a method to dynamically change the service class for a user without requiring a new device. Another need arises for a method to create a new service class without having to rearrange the frequency channelization of the network bandwidth. Finally, to make the device more attractive to users, a need arises for a method to improve network performance and offer flexible service options while only requiring an inexpensive dumb device. The present invention provides a unique and novel solution that meets all the above needs.

DISCLOSURE OF THE INVENTION

The present invention provides a method and apparatus for dynamically allocating time slots in multiple channels of a bandwidth over which a device might communicate on the network.

In one embodiment, the present invention recites a method comprising several steps. First, a request to log onto a network is received from a new device. In the present embodiment, the network is a broadband access network (BAN). Next, a loading condition of the network is determined. The loading is determined by the quantity and identity of channels to which each existing device on a network is allocated. A quantity of channels required by new device is then determined according to the service class to which new device subscribed and to the capability of the device. An identity of a quantity of channels on which the new device is allocated to transmit information is determined.

The identity of the channels is determined according to a desired criteria for the loading condition, such as uniform loading, uniform time-slot vacancies in the multiple channels, uniform quantity of service classes in each channel, or uniform time slot assignments in the multiple channels. A time slot allocation for the new device is identified and communicated, along with the identity of the frequency of channels to the device. Then, communication from the new device is received on the allocated time slots on the allocated identity of quantity of channels. The time slot allocation is updated periodically with the update of channel loading. In this manner, the present invention allows a fairer and more consistent access to the network by devices because it can dynamically assign a channel to a device depending on the loading condition of the network. Consequently, the present invention more evenly utilizes the multiple channel resources and thereby provides better communication performance to the user. All these changes are done at the hub, and thus, the present invention only requires an inexpensive dumb device. In summary, while the prior art would allocate a device to a single channel that would change when the device encountered repeated transmission failures, the present invention evaluates and decides which of the multiple channels the device should transmit on every time it needs to communicate on the network. Consequently it provides even loading, uniform vacancies, and equitable access for all devices.

In another embodiment, the present invention recites a method for dynamically changing, or managing, the service classes on a network, comprising several steps. In one step, a request to change a service class is received from a device. For example, a user wants to change from a narrow bandwidth service class to a wide bandwidth service class because the user has an newly arisen need for transmitting more data. In that situation, a higher quantity of channels is allocated for the higher service class, thus providing a wider bandwidth. In another step, the request is verified against the transmission capability of the device and against the subscription service of the device. In another step, an updated loading condition is determined. Then, in another step, an identify of the channels over which the device can transmit in the new service class is determined based on the loading condition. Finally, the identify of the channels is determined and communicated to the device.

Thus, the present invention provides a method to dynamically change the service class for a user without requiring a new device. The present embodiment also illustrates how the present invention accommodates multiple service classes on a given network bandwidth in flexible manner, while equating channel utilization at the same time. Finally, the present invention accomplishes the methods on a hub, and thus only requires an inexpensive dumb device.

BRIEF DESCRIPTION OF THE DRAWINGS

The accompanying drawings, which are incorporated in and form part of this specification, illustrate embodiments of the invention and, together with the description, serve to explain the principles of the invention. The drawings referred to in this description should be understood as not being drawn to scale except as specifically noted.

PRIOR ART FIG. 1a is a block diagram of a conventional shared media network system.

PRIOR ART FIG. 1b provides an illustration of multiple channels used in a network and exemplifies a conventional assignment of time slots within the multiple channels to multiple devices.

PRIOR ART FIG. 1c provides an illustration of conventional multiple service classes over multiple channels used in a network.

Figure 2A:
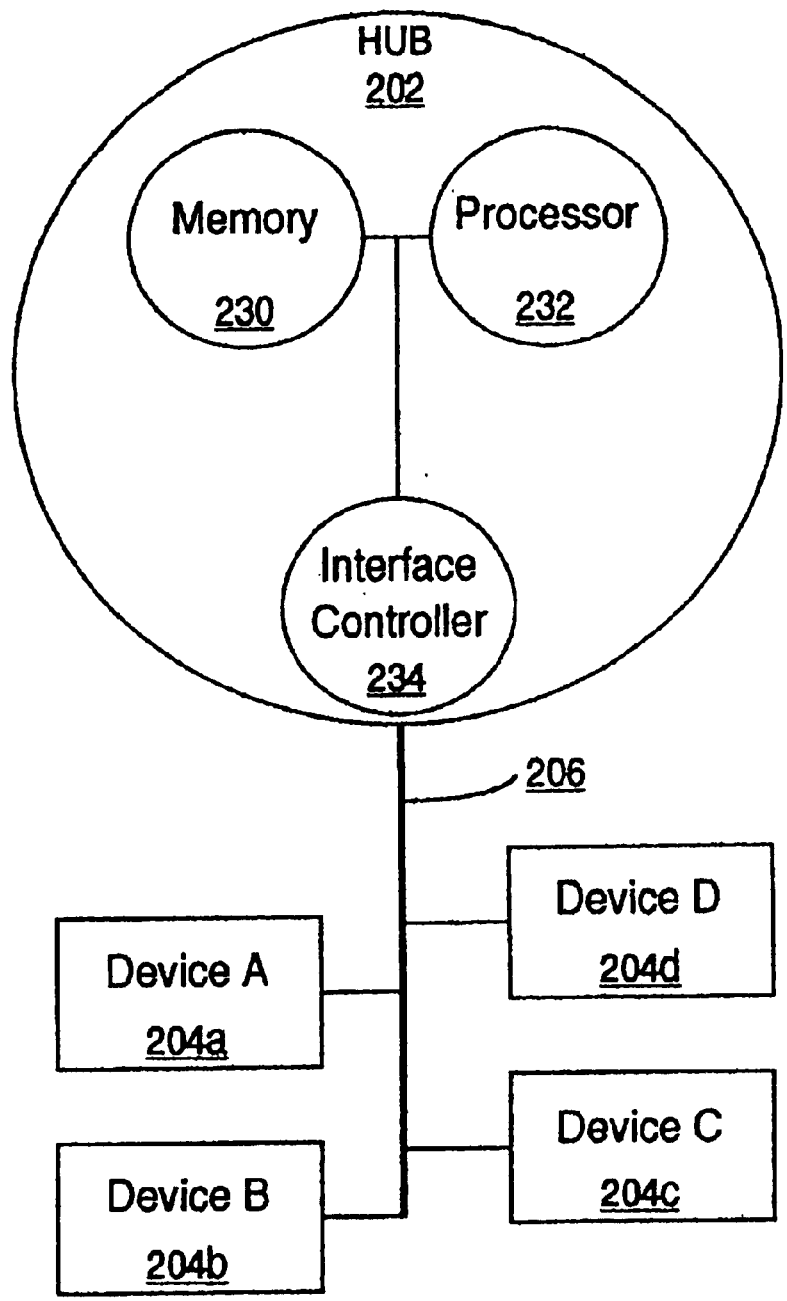

FIG. 2a is a block diagram of a shared media network system incorporating dynamic bandwidth allocation, in accordance with one embodiment of the present invention.

Figure 2B:
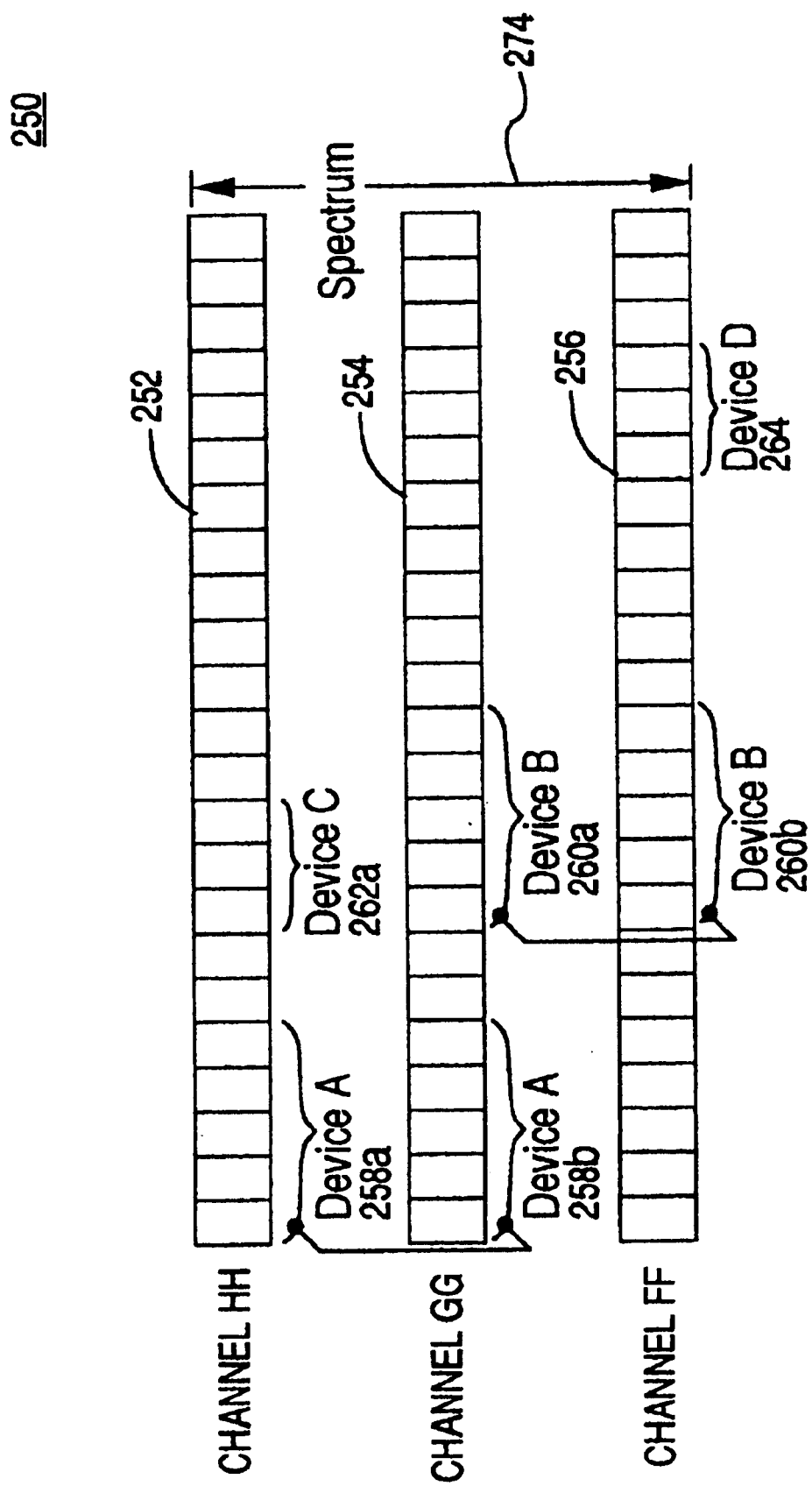

FIG. 2b provides an illustration of multiple channels used in a network and exemplifies the improved assignment of time slots within the multiple channels to multiple devices, in accordance with one embodiment of the present invention.

Figure 2C:
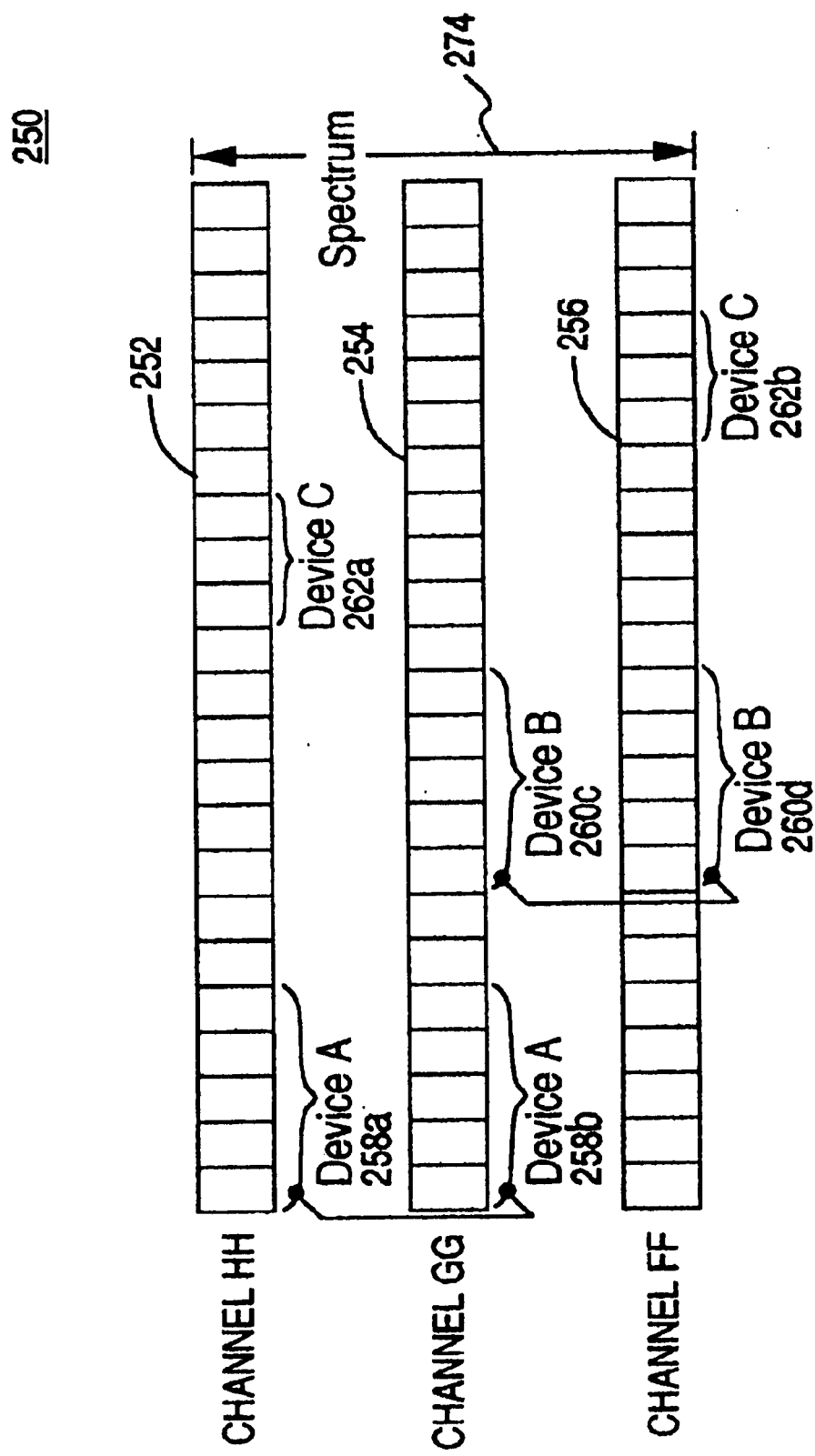

FIG. 2c provides an illustration of multiple channels used in a network and exemplifies the alternating assignment of specific channels to a device, in accordance with one embodiment of the present invention.

Figure 3:
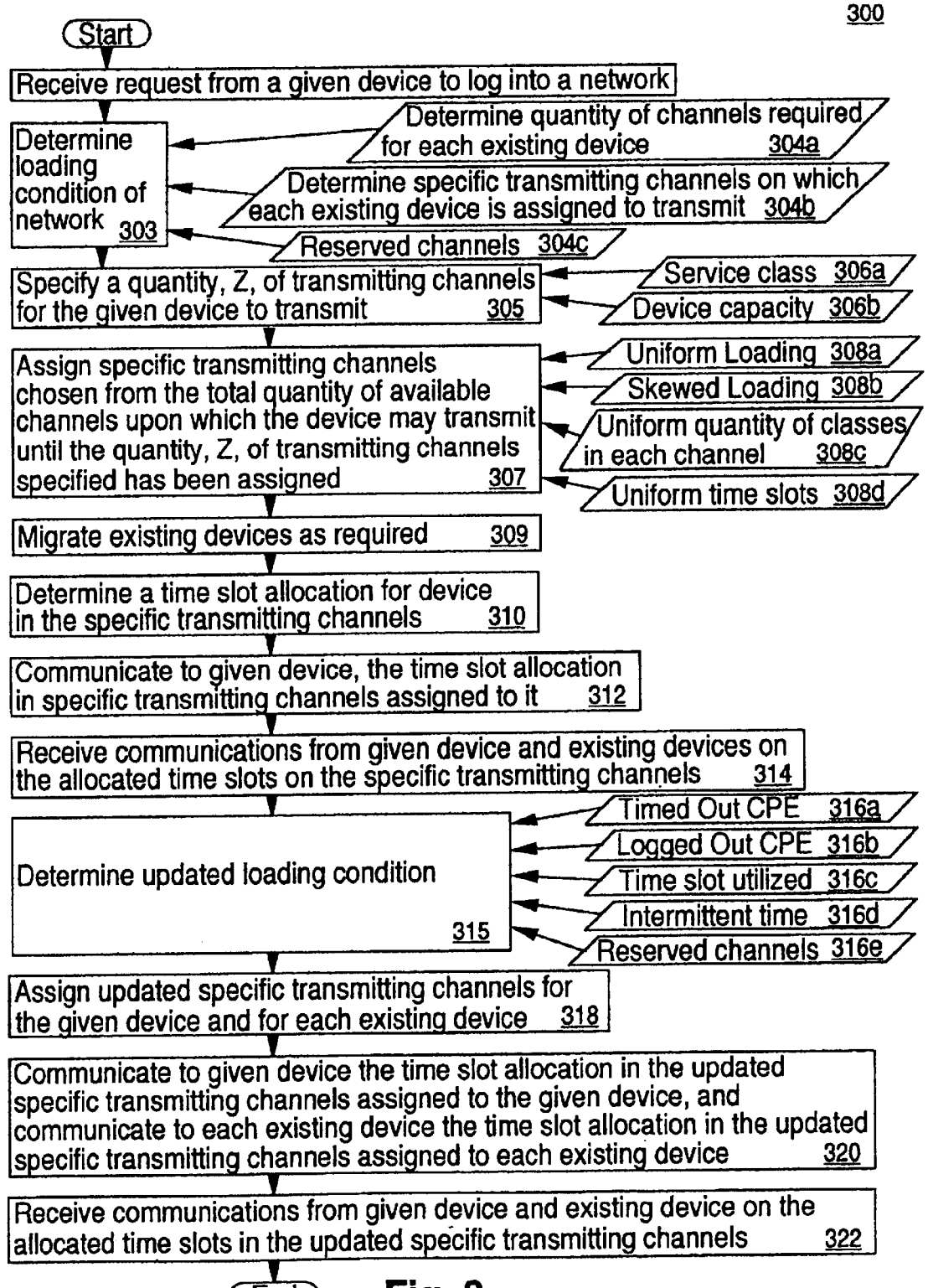

FIG. 3 is a flow chart of the steps performed to dynamically allocate bandwidth in a network, in accordance with one embodiment of the present invention.

Figure 4:
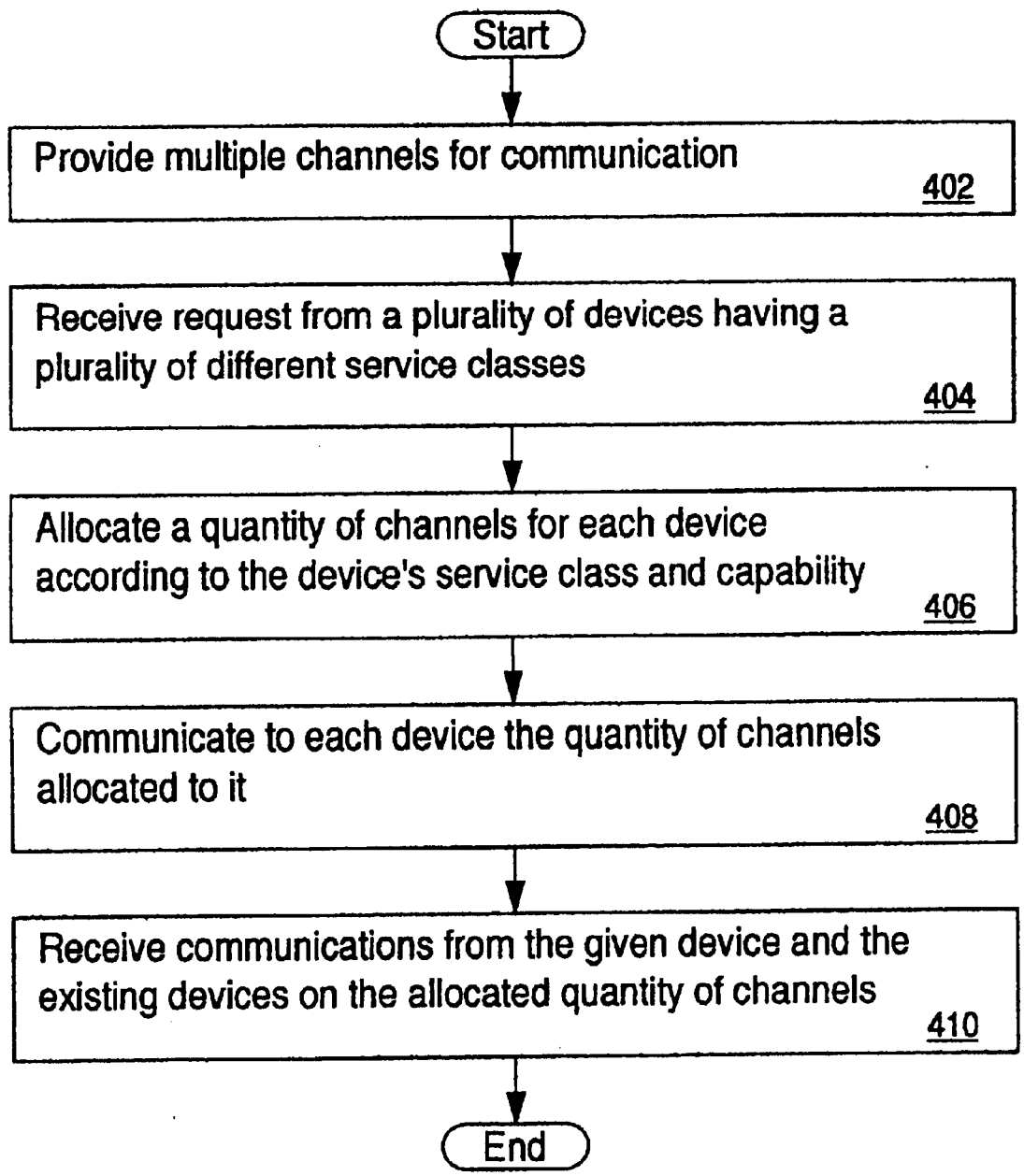

FIG. 4 is a flow chart of the steps performed to provide a plurality of service classes on a network, in accordance with one embodiment of the present invention.

FIG. 5 is a flow chart of the steps performed to dynamically change the service class of a device in a network, in accordance with one embodiment of the present invention.

Figure 6:
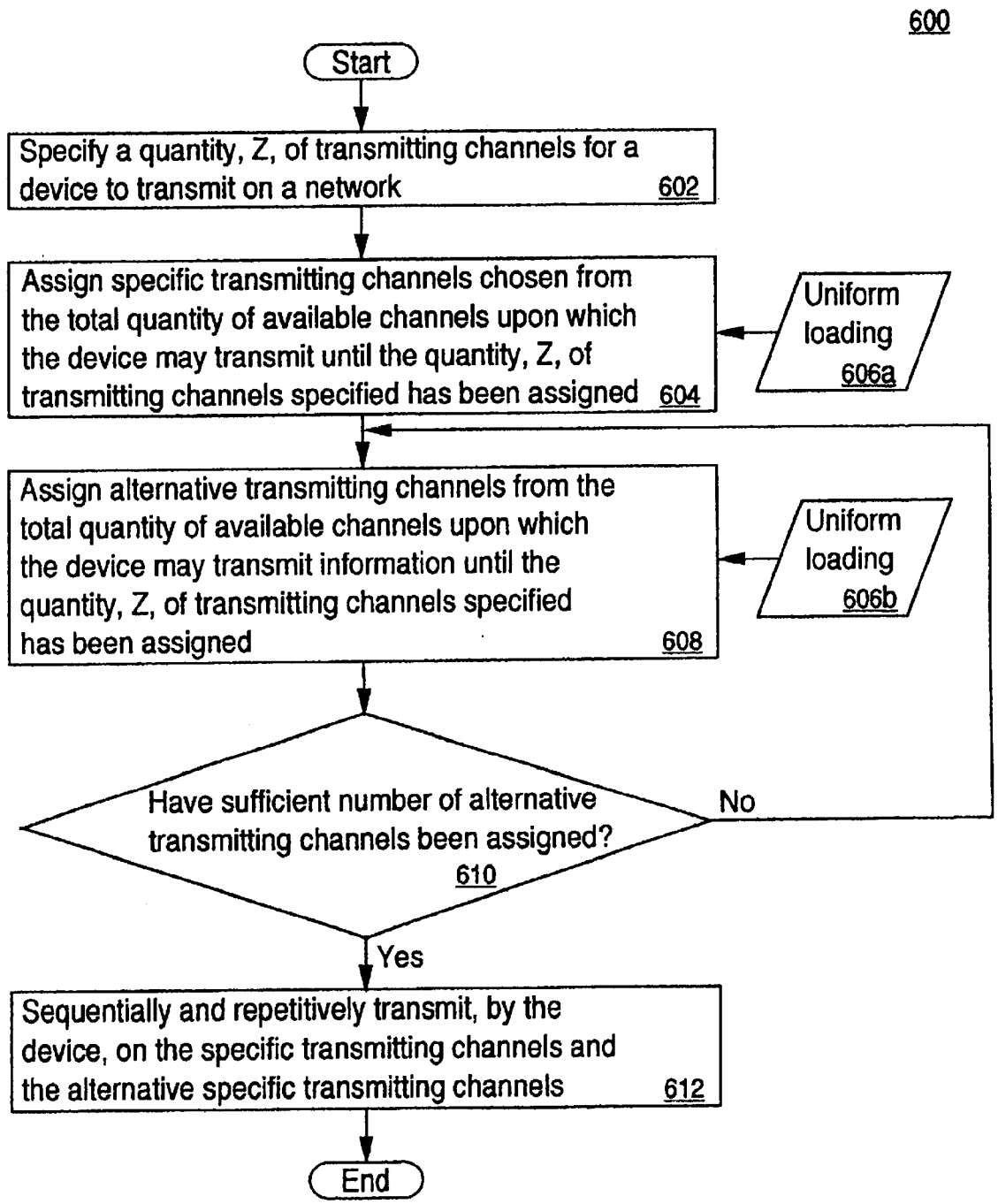

FIG. 6 is a flow chart of the steps performed to allocate sequential alternative transmitting channels in a network, in accordance with one embodiment of the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention can be practiced without these specific details. In other instances, well-known methods, procedures, components, and circuits have not been described in detail as not to unnecessarily obscure aspects of the present invention.

Some portions of the detailed descriptions which follow, e.g., the processes, are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, terms such as or "receiving," "specifying," "assigning," "communicating," "providing," "verifying," "migrating," "determining," "displaying" or the like, refer to the action and processes of a computer system, or similar electronic computing device, that manipulates and transforms data. The data is represented as physical (electronic) quantities within the computer system's registers and memories and is transformed into other data similarly 115 represented as physical quantities within the computer system memories or registers or other such information storage, transmission or display devices.

FIG. 2a presents a block diagram of a shared media network system incorporating dynamic bandwidth allocation, in accordance with one embodiment of the present invention. For exemplary purposes, four Customer Premises Equipment (CPEs) 204a, 204b, 204c, and 204d are coupled to a hub 202 via link 206. Link 206 can provide multiple channels of communication, typically dependent upon the transmitter/receiver capabilities of devices 204a, 204b, 204c, and 204d and the hub 202. The present embodiment utilizes memory in the hub 202 to execute methods found in the following detailed description. Hence, while the prior art may have required devices to be smart devices in order to accomplish advanced networking functions, the present embodiment does not require devices 204a, 204b, 204c, and 204d to be smart devices. Consequently, the present invention provides a lower cost and less complicated device to the user.

The hub of FIG. 2a is comprised of a memory 250 coupled to a processor 252 and to an interface controller 254. In one embodiment, memory 250, processor 252, and interface controller 254 can be discrete components coupled together in hub 202. Alternatively, another embodiment can provide memory 250, processor 252, and interface controller 254 in an integrated circuit. Program instructions are stored in memory 250 that contains program instructions for implementing the methods of the present invention. In an alternative embodiment, program instructions for any of the methods of the present invention can be implemented in hub 202 by using a state-machine device. The methods will be described in more detail hereinafter. By placing the processing functions of the present embodiment in the hub, several benefits arise. First method of the present invention can be consistently applied to the devices. Second, any changes to the method can be accomplished at a single central hub instead of multiple scattered devices. Finally, the cost of devices can be reduced because they do not need expensive processors in order to reap the benefits of the present invention.

FIG. 2b provides an illustration of multiple channels used in a network and exemplifies the improved assignment of time slots within the multiple channels to multiple devices, in accordance with one embodiment of the present invention. The illustration presents a contention access scenario where devices communicate and hope to avoid a collision.

As an example of this embodiment, three channels, channel FF 256, channel GG 254, and channel HH 252 are shown in parallel as they span the spectrum 274 of the network. These channels represent different frequency channels within the spectrum 274. As shown, data packets 258a and 258b for device A 104a are transmitted at the same time in multiple channels, channel HH 252 and channel GG 254, respectively. Likewise, data packets 260a and 260b for device B 104b are transmitted at the same time in multiple channels, channel GG 254 and channel HH 256 respectively. Note that the channels used for data packets 260a and 260b for device B 104b are shifted up from those channels used for data packets 258a and 258b for device A 104a. Alternative embodiments can transmit bandwidths wider than that of a single channel by using any combination of channels. The combination of channels provides the incremental expansion of the bandwidth required for different service classes.

Unlike the prior art that reserved channels for a wider bandwidth service class, the present invention also allows other service classes to access all channels in the present embodiment. In other words, service classes on a network are not limited by channel boundaries in the present invention. As indicated in FIGS. 2b and 2D, users with a wide bandwidth service class and a narrow bandwidth service class can use the same channels for transmission. For example, as shown in FIG. 2b, data packet 258a and 258b for device A occupy channel HH 252 and channel GG 254 at one time, while data packet for device C 262a occupies channel HH 252 at another point. By not limiting a user to only specific channels based on the user's class, the present invention can more effectively utilize all the channels on the network. In comparison, the prior art, as indicated in Prior Art FIG. 1c, limited a wide bandwidth service class to channel DD 174 and narrow bandwidth service class to channel EE 172. Thus, the prior art used channel boundaries to separate service classes. The channel boundary created uneven distribution of load across the transmission spectrum 164 of the network in the prior art, e.g. unused time slots 178. This then, is the problem that the present invention solves. In another embodiment of the present invention, the accessible channels for a given device or service class can be modified or restricted per administrative criteria.

In the present embodiment, the network is a broadband access network (BAN). However, the present invention is applicable to any network having multiple devices sharing multiple channels of communication, or shared media.

FIG. 2c provides an illustration of multiple channels used in a network and exemplifies the alternating assignment of specific channels to a device, in accordance with one embodiment of the present invention. FIG. 2c is essentially identical to FIG. 2b with one exception. The data packet 264 for device D 104d in FIG. 2b is replaced with data packet 262b for device C 104c in FIG. 2c. This change illustrates the assignment of an alternative specific channel on which a device may transmit in order to provide uniform loading conditions on all the total quantity of transmitting channels available in the network. This feature will be more clearly illustrated in the detail description of the associated flowchart hereinafter.

A flow chart 300 presenting the steps performed to dynamically allocate time slots in multiple channels of a bandwidth over which a device can communicate on the network, is presented in FIG. 3. The steps presented in flowchart 300 will be described with reference to hardware illustrated in FIGS. 2a, 2b and 2c, described hereinabove.

As an introduction, the total number of channels in the network will be referred to as the value 'N,' the maximum number of channels available to the highest service class is 'k,' and the minimum number of channels assigned to the lowest service class is 'j' to efficiently utilize the network, one embodiment imposes the criteria that $N \geq k \geq 1$ and $k \geq j \geq 1$. In another embodiment k=N for maximum bandwidth utilization benefit and the associated high-cost trade-off. The present invention is well suited to an infinite number of channelization schemes. Discrete values that can be chosen to suit the wide variety of needs in a specific network.

For purposes of illustration, an example will be carried throughout the detailed description on flowchart 300. In this example, four devices will exist on a hub-spoke network, similar to that illustrated in FIG. 2a. In the present example, the network administrator, or network provider has decided that three uplink transmission channels will be used on the network. With the present invention, transmission service classes can be provided as increments of time slots and of number of channels. Consequently, a much greater amount of flexibility for network transmissions is obtained.

For example, for a CPE modem device having three transmitters at 20 MHz each, three uplink channels of at least 20 MHz each can be provided to obtain a total bandwidth of approximately 60 MHz for this device. The three channels used for this device are not reserved, and hence, can also be used for lower bandwidth devices as deemed appropriate by the network administrator and by the capacity of the other devices. More specifically, in this example the network administrator has decided to provide two service classes, a service class 1 high-end service and a service class 2 low-end service. The service class 1 high-end service will have a bandwidth of two channels, while the service class 2 low-end service will have a bandwidth of one channel. Finally, device A and device B have subscribed to the service class 1 service while device C and device D have subscribed to the service class 2 service. Hence, the present invention allows dynamic and automatic selection of number of channels and of time slots in these channels for providing transmission capability that has two degrees of freedom, one for quantity of time slots, and one for quantity of channels. Again, this is only an example that is not intended to limit the applicability of the present invention to a wide variety of systems, configurations, bandwidths, and frequency channelization schemes. This example will be referred to periodically throughout the following steps. The following table, Table 1.1, helps to illustrate some of the possible embodiments of the steps in flowchart 300. Using Table 1.1 as an example, assume that device A, device B, and device C have already logged on and been allocated time slots in an identify of channels on the network.

TABLE 1.1

| CHANNEL | Service CLASS 1 | Service CLASS 2 | VACANT TIMESLOTS |          |
|---------|-----------------|-----------------|------------------|----------|
| HH      | A,              | C               | X                | Spectrum |
| GG      | A, B            |                 | X                |          |
| FF      | B               |                 | XX               |          |

Hence, Table 1.1 indicates that device A and device B have been spread out across two channels that are different channel combinations for each device. Furthermore, these channel combinations can change to other channels within the communication spectrum of the network. In contrast, the prior art constrained a device to operate on a single channel. Consequently, the present invention provides more flexibility and more balanced utilization of the entire communication spectrum by allowing a device to transmit on different channels. That is, the present invention allows assignment of any frequency channels within a communication spectrum to a multi-channel transmitting service class. Thus, device A will multiplex its double-bandwidth signal to a frequency that covers channels GG and HH while device B will multiplex its double-bandwidth signal to a frequency that covers channels FF and GG. This allows the loading to be spread out over the entire bandwidth of the multichannel network. The prior art would typically allocate a service class 1 device to a static and unchanging channel on the network.

In step 302 of flowchart 300, a request to log onto a network for transmission is received from a device. This embodiment allows a subscription service where a modem user "dials up" and logs onto the network. The present invention is equally applicable to a full-time connected network where a CPE device requests bandwidth using reservation-based protocol after it logs onto the network through an entry process. In the present example, device D logs onto the network to begin communication with the hub. Device D requests bandwidth on the network on which it can transmit data.

In step 303, a loading condition of the network is determined. The loading is determined in one embodiment by determining the quantity of channels, as input 304a, and the specific transmitting channels, as input 304b, to which each existing device on a network is allocated. The loading condition can also utilize time slot reservation input 304c to adjust the loading on the channels. This step is performed by the hub 202 as illustrated in FIG. 2a. The hub utilizes data and program instructions stored in memory 230 that are processed by processor 232 to accomplish this step and other steps.

Referring to the example illustrated in Table 1.1, the loading condition indicates that device A has time slots in channels GG and HH, while device B has time slots in channels NN and GG, and device C has time slots in channel FF. The vacancies are represented simplistically with a quantity of 'X's to indicate the relative amount of vacancies based on quantity of devices in each channel. This determination is just figurative, and true vacancies can be better measured by the time slot allocation, and even by the utilization of the time slots. For example, if device A is allocated time slots in two channels, but the device A is passive and not sending any data, then that channel is not being fully utilized by the devices allocated to it. The present invention could take advantage of this characteristic by assigning more devices to channels that have devices that rarely transmit information on the network.

In step 305, the quantity of channels, Z, required by new device is specified. Two inputs provide data for determining the quantity of channels. First, an input on the service class 307a to which the device has subscribed is provided. Second, an input on the transmission capacity of the device is provided. The transmission capacity includes information such as number of transmitters and channel tuning range of each transmitter. A representative variable of "Z" is provided for clarity in the flowchart. For example, a Z value of "1" for a service class 2, e.g. as allocated to device D, would only allow transmission on a single channel. Alternatively, Z could be any number of channels less than or equal to the total number of channels in the given network.

As an example of step 305, if the device subscribes to a high-end wide bandwidth service, but only has a fixed single channel transmitter in its device, then the device capability is the limiting factor. As another example, if the device subscribes to a low-end narrow bandwidth service, but has a multiple channel transmitter, then the subscription service is the limiting factor. The hub and the method should not reserve channels and time slots if the device does not have the capability to use them. In this manner, the present invention provides efficient use of network resources. In another embodiment, the hub and method could reserve channels per subscription service regardless of the device capability so as to provide the immediate option for installation of an upgraded device. In one embodiment, only information on the quantity of channels is provided to the device for communication on the network. In that case, the loading pattern would probably not be optimal because there is no smart allocation of the identity of where the multiple channels are located.

In step 307, specific transmitting channels on which the new device is allocated to transmit information is assigned, until the quantity, Z, of transmitting channels specified has been assigned. While the previous step determines the quantity of channels, it does not indicate how or where to place that quantity of channels within the multi-channel network. This is assuming that the quantity of channels assigned to the highest service class is less than the maximum quantity of channels in the multi-channel network. If the maximum quantity of channels assigned to the highest service class is equivalent to the maximum number of channels in the network, the device can transmit on every channel, and no identification of the channels is necessary. Otherwise, the specific channel identity will be provided to the device.

The identity of the channels is determined according to an input indicating the desired criteria for the loading condition. For example, alternative embodiments can include criteria such as uniform loading 308a, uniform quantity of service classes 308c in each channel, or uniform time slot assignments 308d in the multiple channels. In another embodiment, channels could be determined based on input criteria such as skewed loading, e.g. to accommodate different service classes. The present invention is also well suited to alternative criteria on which to identify channels for time slot allocation. For example, the network administrator can identify users according to department, priority, etc. as having certain channels. These and other criteria can be utilized by the present invention to utilize network resources in a flexible manner. In this manner, the present invention allows a fairer and more consistent access to the network by devices because it can dynamically assign a channel to a device depending on the loading condition of the network. Consequently, the present invention more evenly utilizes the multiple channel resources and thereby provide better communication performance to the user. With uniform loading, all devices will have approximately the same probability of finding an available time slot on which to transmit. No favoritism in access to the network is shown to any service class or any device within a service class in one embodiment. However, an alternative embodiment can intentionally provide a priority scheme, or skew the loading on channels to accommodate an objective, such as priority access to a designated service class. All these changes are done at the hub, and thus, the present invention only requires inexpensive dumb devices.

Applying step 307 to the example illustrated in Table 1.1, the specific channels, e.g. specific location/identity of channels, is assigned for the quantity of channels determined in the previous step. The quantity and the specific channels can be a single channel or more. For example, the previous step provided a Z quantity of channels equivalent to one channel for device D. The specific channels to be assigned are chosen from among the multiple channels available in the network, according to one of the selection criteria. For exemplary purposes, if a uniform quantity of vacancies was the selection criteria, then the identity of the channel for device D would be channel FF because it has an additional vacancy 'X' over all the other channels. If more than one choice of channels would be available, the present invention envisions the use a secondary criteria to choose the channel. For example, a channel for a single-channel device could be chosen such that it does not split other available channels that are adjacent to each other. By not selecting adjacent available channels when an isolated channel is available, a potential future multi-channel device would be able to more easily find a set of channels over which it can transmit.

In step 309, devices with previously assigned channels for transmission are migrated to different channels as required to provide a balanced loading of the network resources. This step is illustrated in the following tables, Table 1.2, Table 1.3a, and Table 1.3b. While step 309 is shown in the present embodiment to provide a superior loading condition on the network, it is not required for the present invention.

As an illustration of a migration operation for balancing the loading condition on the network, consider the following example with respect to flowchart 300. The first table, Table 1.2, represents an initial channel assignment for hypothetical device A, device C, and device D. In the initial channel assignment, device B is not available to transmit on the network.

TABLE 1.2

Initial Configuration for Channel Assignment

| CHANNEL | Service CLASS 1 | Service CLASS 2 | VACANT TIMESLOTS | |
|---------|-----------------|-----------------|------------------|----------|
| HH | A | | XX | |
| GG | A | C | X | Spectrum |
| FF | | D | XX | |

However, at some later time, device B logs onto the network and wants to transmit information. Device B, a service class 1 device, needs two channels for transmission. Table 1.3a provides option #1 for assigning channels in the network. With Table 1.3a, there is no migration of existing channel assignments occurs. In other words, the original channel assignments from Table 1.2 for device A, device C, and device D remain the same. Unfortunately, the vacant timeslots column indicates the lack of balance on the channels in the network.

TABLE 1.3a

Option #1 for Channel Assignment

| CHANNEL | Service CLASS 1 | Service CLASS 2 | VACANT TIMESLOTS | |
|---|---|---|---|---|
| HH | A |   | XX | Spectrum ↕ |
| GG | A, B | C |   | |
| FF | B | D | X | |

As a solution to the imbalance of channels in Table 1.3a, consider option #2 presented in Table 1.3b. With Table 1.3b, device C has migrated from channel GG to channel FF to provide resources for device B to transmit on channels HH and GG. Consequently, the channel resources of the network are more evenly distributed as indicated by the balanced quantity of representative vacant timeslots "X" in every channel in Table 1.3b. A hub or server could perform the analysis to determine whether migration is necessary and to provide the subsequent instructions to the appropriate device to be migrated. Consequently, the present invention provides a method for balanced utilization of resources on the network.

TABLE 1.3b

Option #2 for Channel Assignment

| CHANNEL | Service CLASS 1 | Service CLASS 2 | VACANT TIMESLOTS | |
|---|---|---|---|---|
| HH | A, B |   | X | Spectrum ↕ |
| GG | A, B |   | X | |
| FF |   | C, D | X | |

In step 310, a time slot allocation for the new device is determined for the specific transmitting channels. The time slot allocation indicates the quantity of time slots which a device can utilize for transmitting packets of information over the identity of channels which it has been allocated. The choice for time slot allocation is typically performed by the hub, based on service options. In one embodiment, all service classes are allocated the same quantity of time slots, while in another embodiment, the quantity can be varied.

In step 312, the time slot allocation in the specific transmitting channels is communicated to the device. After receiving this information, the device is now configured and ready to transmit on the network.

In step 314 communication from new device is received on the allocated time slots on the specific transmission channels assigned. This step essentially closes the loop for the process which started with the device logging onto the network.

In step 315, an updated loading condition is determined. Steps 315 through 322 are provided for ongoing traffic management and network utilization. In one embodiment, these steps are not required. In alternative embodiments, one or more of these steps can be utilized as deemed appropriate by users, the hub, a network administrator, or some other decision source. By updating the loading condition and the channel assignment, network utilization and quality of service can be maintained over time instead of just at the time when a new user logs on to the network.

Step 315 can utilize any number of criteria for updating the loading condition. Flowchart 300 illustrates some of the inputs that can determine the criteria for the updated loading condition. Several embodiments of inputs include the following.

Input 316a uses a timed-out device as a criteria. In this situation, if a device fails to communicate on the network for a certain amount of time, then it can be safely assumed that either the user has no intention of transmitting with the device, the device has experienced a failure, or etc. The decision about a time-out is an administrative and quality-of-service determination. If a device does not utilize its assigned channels for an extended period of time, then it essentially ties up the channels unnecessarily. These unutilized channels could be used for redistributing existing devices if there is any existing nonuniformity in the network.

Similarly, input 316b uses a logged out criteria for updating the loading condition. That is, when a device logs out, the request to log out initiates the updated loading detrmination and subsequent steps. This can be beneficial because there might be a significant time lapse between loading conditions determined for devices logging into the network.

Input 316c uses time slot utilization to update the loading condition. For example, if a device is transmitting on the network, but only does so once every 60 minutes, then it could be placed on a busier channel or a channel with devices having a higher utilization so as to provide a balance.

Input 316d uses an intermittent time criteria to update the loading condition. The intermittent time can be predetermined by a network administrator or a user, or the intermittent time can be random. The intermittent time criteria would utilize less resources because it would not have to use a processor to constantly check for a timed-out device, etc. Rather, it would just wait until the intermittent time elapsed from the last update operation. Hence, it could be a simple and effective method, depending upon the specific application.

Input 316e uses time slot reservation input 304c to adjust the loading condition. In this manner, a device that reserves a large amount of bandwidth or time slots without detrimentally affecting the devices on the same channels.

In step 318, the specific transmitting channels for the given device and for each existing device are assigned. This step is similar to step 307. The assignment of channels continues until the quantity of transmitting channels specified for the device have been assigned.

Although not explicitly stated, this step could implicitly require a device to migrate to another channel. In the case of an update, a likely scenario is that an existing device assigned to specific channels has logged out of the network, and thus created a new imbalance in the loading condition of the network. Thus, for example, if Table 1.3b represented the existing channel assignments at an initial point in time, and device C and device D subsequently log off or are removed from the network for some reason, then an imbalance in the loading condition of the network would exist. However, the hub or server could update the loading condition, per step 315, realize that an imbalance exists, then indicate a new channel assignment, per step 318, using similar inputs to 308*a*–308*d*. The result of such steps, could provide a channel assignment such as the example of Table 1.4, below. Hence, by using the present invention a more balanced loading condition of the network could be obtained.

the previous flowchart. The aggregate of the quantity of channels for each service class does not have to equal the total number of channels in the network. In other words, different service classes can utilize the same channels, albeit at different times. This allows the present invention to provide a flexible utilization of the multi-channel network.

In step 410, communication from the devices is received on the correct quantity of channels. This step closes the loop to the communication process whereby data is actually transmitted by the device on the network.

The multiple service classes referred to in flowchart 400 are implemented in the CPE devices as follows. CPE devices, e.g. devices A–D 204*a*–204*d*, used with the present invention can have either a single frequency tunable transmitter or a multiple transmitter array. If a CPE device has a single transmitter design, it should be able to tune the full range of the frequency channels in which it is granted

TABLE 1.4

Result of Updated Loading Condition and Migration of Device

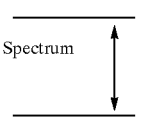

A flow chart 400 of the steps performed to provide a plurality of service classes on a network, in accordance with one embodiment of the present invention, is presented in FIG. 4. The present embodiment also illustrates how the present invention accommodates multiple service classes on a given network bandwidth in flexible manner, while equating channel utilization at the same time. Finally, the present invention accomplishes the methods on a hub, and thus does not require expensive smart devices. Alternatively, the present invention could use a server computer rather than a hub to perform the methods described herein.

In step 402, multiple channels of communication are provided on a network. With multiple channels, multiple service classes for varying bandwidths can be implemented. The choice of frequency channelization is an administrative decision that can have infinite possibilities. The present invention is applicable to all these choices.

In step 404, a request from each of a plurality of devices having a plurality of different service classes is received. The requests do not have to be received at the same time or in any type of sequence. Alternatively, different service classes could be assigned instead of requested.

In step 406, a quantity of channels for each device is allocated according to a service class. In this embodiment, a high-end service class requiring a wide bandwidth is treated as a multiple of a low-end service class requiring a narrow, or just a single channel, bandwidth. Hence, the quantity of channels can be established to be proportionate to the level of service class desired. In another embodiment, a higher service class can be allocated a narrow bandwidth, but with a high priority of access to the channels assigned for that bandwidth to provide the service desired. Additionally, the quantity of channels is chosen from within the frequency spectrum of the communication network.

In step 408, the quantity of channels is allocated to the devices so they can transmit on the correct quantity of channels. To further enhance the multiple service capability, the loading condition can be accommodated as described in access. This is because efficient use of the frequency spectrum could require a user to transmit on different frequency channels at different times. For example, device C transmits a data packet 262*a* on channel HH at one time, then it transmits a data packet 262*b* on channel FF at a different time, for the example presented in FIG. 2*c*. In this manner, traffic is balanced across all the channels. However, to do this, a single transmitter device must be able to tune to the full range of the frequency spectrum 274, for the example of FIG. 2*c*. Time slots allocated to the CPE by the hub in each time frame can scatter in any of the accessible frequency channels. These time slots do not overlap in time so the theoretical maximum bandwidth achievable by a single transmitter CPE is the bandwidth of one entire frequency channel, as illustrated with data packets 262*a* and 262*b*. Because a single transmitter requires time to change frequencies, some guard bands in the time slots might be necessary.

Alternatively, CPE devices, e.g. devices A–D 204*a*–204*d*, used with the present invention can have a multiple transmitter array. With multiple transmitters, a greater aggregate bandwidth service results that will reduce or eliminate tuning delay. In one case, if the number of transmitters in the CPE device equals the number of accessible channels (e.g. per contracted service or per network design), then no frequency tuning is needed for channel selections, assuming each transmitter is pretuned to transmit on one of the channels. This case would eliminate tuning delays and allow simultaneous transmission in time slots. In this case, the theoretical maximum bandwidth achievable becomes the bandwidth of all the frequency channels accessible by the CPE. The tradeoff with using the easy to implement multiple fixed channel transmitters is a higher cost than the single transmitter design. One compromise is to use fewer transmitters with a smaller frequency tuning range.

A flow chart 500 of the steps performed to dynamically change the service class of a device in a network, in accordance with one embodiment of the present invention, is presented in FIG. 5. By using the present embodiment the service class for a user can be dynamically changed without requiring a new device, costly modifications to the device, or significant involvement by a network administrator. Additionally the present embodiment can create a new service class without having to rearrange the frequency channelization of the network bandwidth. Flowchart 500 is comprised of the following steps.

In step 502, a request to change a service class of a device is received from the device. For example, a user might want to change from a narrow bandwidth service class to a wide bandwidth class because the user has a need for transmitting more data. In that situation, a higher quantity of time slots and/or channels is allocated for the higher service class, thus providing a wider bandwidth. Alternatively, the request for a change in service class could also come from an administrative program or database as a response to the user's failure to pay the service fee, etc.

In step 504, the request is verified against the transmission capability of the device and against the subscription service of the device. In this manner, the present embodiment performs a check on the validity of the devices request. The hub and the method should not reserve channels and time slots if the device does not have the capability to use them. Assuming the network is a subscription service, accurate billing and allocation of resources is necessary. If the network is an educational or intra-company network, then the administration could allow users to change their service on-demand and without verification.

In step 506, a loading condition is determined. The details of this step covered in the flowchart 300 described hereinabove. The same concepts used in flowchart 300 can be incorporated for the present embodiment.

In step 508, specific transmitting channels on which the device can transmit are assigned, based on the loading condition and on the service class. Hence, a correct quantity of channels will be chosen according to the loading condition evaluated over one or more criteria, such as uniform vacancy distribution. The criteria and options for the identity of channels is described in flowchart 300, hereinabove.

Finally, in step 510, the identify of the channels is communicated to the device. This step completes the method of changing the service. Although not included in flowchart 500, an additional step of receiving communication over the identify of channels is a natural ensuing step. However, it is not required for the method of actually changing the service class. By using this method, the present embodiment provides a quick and low-cost method of changing a service class for a device. Changes can be incorporated at the hub and not at the device. Also, changes can occur dynamically and without hardware modifications. This saves the user valuable time and resources.

A flow chart 600 of the steps performed to allocate sequential alternative transmitting channels in a network, in accordance with one embodiment of the present invention, is presented in FIG. 6. By using the present embodiment, the present invention provides a method and apparatus to allow a new device to transmit on evenly loaded channels without upsetting the even loading. It also provides a tool for alternative transmission by a device. Flowchart 600 is comprised of the following steps.

In step 602, a quantity, Z, of transmitting channels for a device to transmit on a network is specified. This step can be performed using the inputs provided in step 305 of flowchart 300.

In step 604, specific transmitting channels chosen from the total quantity of available channels upon which the device can transmit is assigned until the quantity of transmitting channels specified, Z, e.g. specified in the previous step, has been assigned. An input to this step for the present embodiment is a uniform loading 606a. Alternatively, numerous other inputs, such as 308a, 308b, 308c, and 308d from flowchart 300, can be utilized to assign specific transmitting channels.

In step 608, Alternative transmitting channels from the total quantity of available channels upon which the device can transmit is assigned until the quantity of transmitting channels, Z, specified has been assigned. An input to step 608 can also be uniform loading 608b, or the alternatives referred to in step 604.

Step 608 is illustrated in FIG. 2c and in Table 2.1. Referring to Table 2.1, if device A and B were assigned the channels indicated as service class 1 users, then the network would remain unbalanced, or unevenly loaded, if device C were assigned to a single channel as a service class 2 device, e.g. a single transmitting channel device. But utilizing the present embodiment, an alternative transmitting channel can be specified for device C. In the example illustrated in Table 2.1, device C is provided a specific transmitting channel of HH and an alternative transmitting channel of FF on which to sequentially and repetitively transmit. Because the quantity of channels, Z, upon which device C is allowed to transmit is a value of "1," only one specific channel is chosen as the specific transmitting channel and the alternative transmitting channel. In operation, device C would transmit a first data packet on channel HH, then a second data packet on channel FF, then a third data packet on channel HH, and so on. By using the present embodiment, the vacant timeslots are equally distributed as shown in Table 2.1.

TABLE 2.1

| CHANNEL | Service CLASS 1 | Service CLASS 2 | VACANT TIMESLOTS | |
| --- | --- | --- | --- | --- |
| HH | A | C (1st) | X | Spectrum |
| GG | A, B | | X | |
| FF | B | C (2nd) | X | |

Several alternatives exist to the present embodiment. The order of channels transmitted on is not significant. The order of channels transmitted on could be tailored to the needs of a device or the network. Likewise, the present invention is not limited to providing alternate transmission channels only to a service class 2 device. Devices transmitting on multiple channels can also have alternative transmission channels. Thus, for example, device A could transmit on channel HH and GG for a first data packet and on channel GG and FF for a second data packet. Similarly, more than one alternative transmission channel can be chosen. Thus, for example, device C could alternatively transmit on channel HH, then channel GG, then channel FF. Hence, the present embodiment provides a method and apparatus to allow a new device to transmit on evenly loaded channels without upsetting the even loading.

In view of all the embodiments presented herein, the present invention provides a method and apparatus that allows fairer and more consistent access to the network by devices because it can dynamically assign a channel to a device depending on the loading condition of the network. Consequently, the present invention more evenly utilizes the multiple channel resources and thereby provide better communication performance to the user. Thus, the present invention provides a method to dynamically change the service class for a user without requiring a new device. The present embodiment also illustrates how the present invention accommodates multiple service classes on a given network bandwidth in flexible manner, while equating channel utilization at the same time. Finally, the present invention accomplishes the methods on a hub, and thus only requires inexpensive dumb devices.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. In a shared media network, a method of dynamically allocating bandwidth resources to a device coupled to said network, said method comprising the steps of:
    continuously determining a loading condition on each of a total quantity of available channels for communication on said network;
    dynamically specifying a quantity of transmitting channels for said device to transmit on said network;
    assigning specific transmitting channels chosen from said total quantity of available channels upon which said device can transmit until said quantity of
    transmitting channels have all been assigned, said assigning of specific transmitting channels based upon said loading condition on each of said total quantity of available channels;
    automatically migrating an existing device on said network to newly assigned specific
    transmitting channels based upon said continuously determined loading condition; and sequentially and repetitively transmitting by said device, on said specific transmitting channels followed by an alternative specific transmitting channels.

2. The method recited in claim 1 further comprising the steps of:
    determining an updated loading condition of said network;
    assigning updated specific transmitting channels from said total quantity of available channels upon which each existing device coupled to said network can transmit, said assigning of specific transmitting channels based upon said loading condition on each of said total quantity of available channels; and
    respectively communicating said updated specific transmitting channels to said each existing device coupled to said network.

3. The method recited in claim 1 wherein said quantity of transmitting channels allocated is based upon a transmission capability of said device and a service class subscribed by said device.

4. The method recited in claim 1 wherein said step of determining a loading condition comprises the step of:
    determining specific transmitting channels already assigned to existing devices coupled to said network.

5. The method recited in claim 4 wherein said step of assigning specific transmitting channels provides an approximately uniform quantity of a plurality of service classes across said multiple channels of said network.

6. The method recited in claim 1 wherein said step of assigning specific transmitting channels is performed such that said loading condition will be approximately uniform for each of said available channels for communication on said network.

7. The method recited in claim 1 further comprising the step of:
    determining a time slot allocation for said device for said specific transmitting channels;
    communicating to said device said time slot allocation in said specific
    transmitting channels on which said device can transmit information; and
    receiving communications from said device according to said time slot allocation in said specific transmitting channels.

8. The method recited in claim 1 wherein said network is a multichannel broadband access modem network.

9. The method recited in claim 1 wherein said quantity of transmitting channels specified for said device can be different from a quantity of channels specified for one of said existing devices coupled to said network, thereby providing a plurality of service classes on said network.

10. The method recited in claim 9 wherein said plurality of service classes includes at least a low-end service class having at least one channel for communication and includes a high-end service class having a plurality of channels for communication, said plurality of channels exceeding in quantity said at least one channel.

11. The method recited in claim 1 further comprising the step of:
    receiving a request from said device to log into said network, said step of determining a loading condition initiated each time said request to log into said network is received.

12. In a network, a method of dynamically allocating sequential alternative transmitting channels to a device coupled to said network said method comprising the steps of:
    dynamically specifying a quantity of transmitting channels for said device to transmit on said network;
    assigning specific transmitting channels chosen from said total quantity of available channels upon which said device can transmit until said quantity of transmitting channels specified have all been assigned;
    assigning alternative specific transmitting channels chosen from said total quantity of available channels upon which said device can transmit until a quantity of transmitting channels specified have all been assigned;
    automatically migrating an existing device on said network to newly assigned specific transmitting channels based upon a continuously determined loading condition; and sequentially and repetitively transmitting, by said device, on said specific transmitting channels followed by said alternative specific transmitting channels.

13. The method as recited in claim 12 wherein said step of assigning alternative specific transmitting channels can be repeated by as many non-repeating alternative specific transmitting channels as exist within said total quantity of available channels for communication in said network.

14. The method as recited in claim 12, wherein said alternative specific transmitting channels and alternating transmission times are chosen such that said loading condition will be approximately uniform for each of said available channels for communication on said network.

15. In a network, a method of providing a plurality of service classes on said network, said method comprising the steps of:
providing multiple channels for communicating on said network;
receiving a request from devices having a plurality of different service classes;
allocating a quantity of channels for each of said devices, said quantity of channels being proportional to each of said plurality of different service classes, said quantity of channels chosen from a frequency spectrum of said network;
communicating, to each of said devices, said quantity of channels allocated to it;
and receiving communication on said network by each of said devices on their respectively allocated said quantity of channels;
automatically migrating an existing device on said network to newly assigned specific transmitting channels based upon a continuously determined loading condition; and sequentially and repetitively transmitting, by said device, on said specific transmitting channels followed by alternative specific transmitting channels.

16. The method recited in claim 15 wherein said quantity of channels is capable of having an identical channel for more than one of said plurality of different service classes.

17. The method of claim 16 wherein said plurality of service classes has at least a high-end service class and a low-end service class, said high-end service class treated as a multiple of said low end service class.

18. The method recited in claim 17 wherein a quantity of channels allocated to a highest-end service class is less than a total quantity of channels available in said network.

19. In a network, a method of dynamically changing a service class for a device, said method comprising the steps of:
receiving at a hub, a request to change a device from a first service class to a second service class;
determining a quantity of channels on which said device can transmit appropriate for said second service class;
communicating information on said quantity of channels to said device
assigning specific transmitting channels chosen from said total quantity of available channels upon which said device can transmit until said quantity of
transmitting channels have all been assigned, said assigning of specific transmitting channels based upon a loading condition on each of said total quantity of available channels; and
automatically migrating an existing device on said network to newly assigned specific transmitting channels based upon a continuously determined loading condition; and sequentially and repetitively transmitting, by said device, on said specific transmitting channels followed by alternative specific transmitting channels.

20. The method recited in claim 19 further comprising the step of:
verifying said request against a transmission capability of said device and against a subscription service of said device.

21. The method recited in claim 19 further comprising the step of:
determining a loading condition of said network.

22. A hub for communicating in a network, said hub comprising:
a processor;
an interface controller; and
a computer readable memory unit or a state-machine, said computer readable memory unit or said state-machine coupled to said interface controller and coupled to said processor, said computer readable memory unit or said state-machine containing program instructions stored therein that when executed over said processor implement a method for dynamically allocating bandwidth resources of a network, said method comprising the steps of:
receiving a request from a device to log into said network, said network having a plurality of channels for communicating;
continuously determining a loading condition of said network;
determining a quantity of channels in said network on which said device is allocated to transmit information, said quantity of channels chosen according to said loading condition of said network, said identity of a first quantity of channels capable of being independent of an identity of a second quantity of channels on which existing devices are allocated to transmit information;
receiving communications from a new device on said first quantity of channels; and
automatically migrating an existing device on said network to newly assigned specific transmitting channels based upon said continuously determined loading condition; and sequentially and repetitively transmitting by said device, on said specific transmitting channels followed by alternative specific transmitting channels.

23. A hub for communicating in a network, said hub comprising:
a processor;
an interface controller; and
a computer readable memory unit or a state-machine, said computer readable memory unit or said state-machine coupled to said interface controller and coupled to said processor, said computer readable memory unit or said state-machine containing program instructions stored therein that when executed over said processor implement a method for providing a plurality of service classes on said network, said method comprising the steps of:
providing multiple channels for communicating on said network;
receiving a request from devices having a plurality of different service classes;
allocating a quantity of channels for each of said devices, said quantity of channels being proportional to each of said plurality of different service classes, said quantity of channels chosen from a frequency spectrum of said network;

communicating, to each of said devices, said quantity of channels allocated to it;

receiving communication on said network by each of said devices; and automatically migrating an existing device on said network to newly assigned specific transmitting channels based upon a continuously determined loading condition; and sequentially and repetitively transmitting, by said device, on said specific transmitting channels followed by alternative specific transmitting channels.

24. A hub for communicating in a network, said hub comprising:

a processor;

an interface controller; and a computer readable memory unit or a state-machine, said computer readable memory unit or said state-machine coupled to said interface controller and coupled to said processor, said computer readable memory unit or said state-machine containing program instructions stored therein that when executed over said processor implement a method for dynamically changing a service class for a device, said method comprising the steps of:

receiving at a hub, a request to change a device from a first service class to a second service class;

determining a quantity of channels on which said device can transmit appropriate for said second service class;

communicating said identity of channels to said device; and automatically migrating an existing device on said network to newly assigned specific transmitting channels based upon a continuously determined loading condition; and sequentially and repetitively transmitting, by said device, on said specific transmitting channels followed by alternative specific transmitting channels.

25. A hub for communicating in a network, said hub comprising:

a processor;

an interface controller; and a computer readable memory unit or a state-machine, said computer readable memory unit or said state-machine coupled to said interface controller and coupled to said processor, said computer readable memory unit or said state-machine containing program instructions stored therein that when executed over said processor implement a method of dynamically allocating sequential alternative transmitting channels to a device on said network, said method comprising the steps of:

specifying a quantity of transmitting channels for said device to transmit on said network;

assigning specific transmitting channels chosen from said total quantity of available channels upon which said device can transmit until said quantity of transmitting channels has been assigned;

assigning alternative specific transmitting channels chosen from said total quantity of available channels upon which said device can transmit until said quantity of transmitting channels has been assigned;

receiving sequential and repetitive transmissions from said device, on said specific transmitting channels followed by said alternative specific transmitting channels; and automatically migrating an existing device on said network to newly assigned specific transmitting channels based upon a continuously determined loading condition.

26. A network having optimized bandwidth utilization, said network comprising:

a bus a hub;

a link, said bus having multiple channels;

a first device, said first device coupled to said hub by said link, said first device having a single transmitter capable of spanning the entire frequency range of said network for providing a first service class;

a second device, said second device coupled to said hub, said second device having a plurality of transmitters for simultaneous transmission over a plurality of channels, said plurality of transmitters capable of spanning the entire frequency range of said network for providing a second service class; and automatically migrating an existing device on said network to newly assigned specific transmitting channels based upon a continuously determined loading condition; and sequentially and repetitively transmitting, by said device on said specific transmitting channels followed by alternative specific transmitting channels.

27. The network recited in claim 26 wherein said first device and said second device have a dumb configuration.

* * * * *